(12) United States Patent
Ishizeki et al.

(10) Patent No.: US 10,933,719 B2
(45) Date of Patent: Mar. 2, 2021

(54) VEHICLE AIR-CONDITIONING APPARATUS

(71) Applicant: SANDEN AUTOMOTIVE CLIMATE SYSTEMS CORPORATION, Isesaki (JP)

(72) Inventors: Tetsuya Ishizeki, Isesaki (JP); Kouhei Yamashita, Isesaki (JP); Ryo Miyakoshi, Isesaki (JP)

(73) Assignee: Sanden Automotive Climate Systems Corporation, Isesaki (JP)

( * ) Notice: Subject to any disclaimer, the term of this patent is extended or adjusted under 35 U.S.C. 154(b) by 73 days.

(21) Appl. No.: 16/330,008

(22) PCT Filed: Aug. 10, 2017

(86) PCT No.: PCT/JP2017/029579
§ 371 (c)(1),
(2) Date: Mar. 1, 2019

(87) PCT Pub. No.: WO2018/043152
PCT Pub. Date: Mar. 8, 2018

(65) Prior Publication Data
US 2019/0202266 A1 Jul. 4, 2019

(30) Foreign Application Priority Data
Sep. 2, 2016 (JP) .................................. 2016-172221

(51) Int. Cl.
*B60H 1/32* (2006.01)
*B60H 1/22* (2006.01)
(Continued)

(52) U.S. Cl.
CPC .............. *B60H 1/3216* (2013.01); *B60H 1/22* (2013.01); *B60H 1/34* (2013.01); *B60H 3/024* (2013.01)

(58) Field of Classification Search
CPC ...... B60H 1/22; B60H 1/2218; B60H 1/3207; B60H 1/3216; B60H 1/3246; B60H 2001/2228; B60H 2001/224
See application file for complete search history.

(56) References Cited

U.S. PATENT DOCUMENTS

| 5,331,823 A * | 7/1994 | Matsuoka | B60H 1/00007 454/93 |
| 2015/0122472 A1* | 5/2015 | Higuchi | B60H 1/00007 165/202 |
| 2015/0314668 A1* | 11/2015 | Suzuki | F25B 5/02 62/160 |

FOREIGN PATENT DOCUMENTS

| JP | 2010-030435 A | 12/2010 |
| JP | 2013-014327 A | 1/2013 |

(Continued)

OTHER PUBLICATIONS

Japan Patent Office, International Search Report issued in International Application No. PCT/JP2017/029579, dated Oct. 24, 2017.

*Primary Examiner* — Marc E Norman
(74) *Attorney, Agent, or Firm* — Baker Botts L.L.P.

(57) ABSTRACT

A vehicle air-conditioning apparatus is provided which is capable of efficiently eliminating or suppressing fogging of a window while comfortably heating a vehicle interior. A controller changes and executes a heating mode to let a refrigerant discharged from a compressor 2 radiate heat in a radiator 4, and a dehumidifying and heating mode to let the refrigerant discharged from the compressor radiate heat in the radiator and let the refrigerant absorb heat in a heat absorber 9. When the temperature of air blown out to the vehicle interior is not capable of reaching a target outlet temperature in the dehumidifying and heating mode, the controller actuates a window heater 35 heating a front window 30 and shifts to the heating mode.

11 Claims, 9 Drawing Sheets

(51) Int. Cl.
*B60H 1/34* (2006.01)
*B60H 3/02* (2006.01)

(56) References Cited

FOREIGN PATENT DOCUMENTS

| | | |
|---|---|---|
| JP | 2014-008858 A | 1/2014 |
| JP | 2014-213765 A | 11/2014 |
| JP | 2016-064704 A | 4/2016 |

* cited by examiner

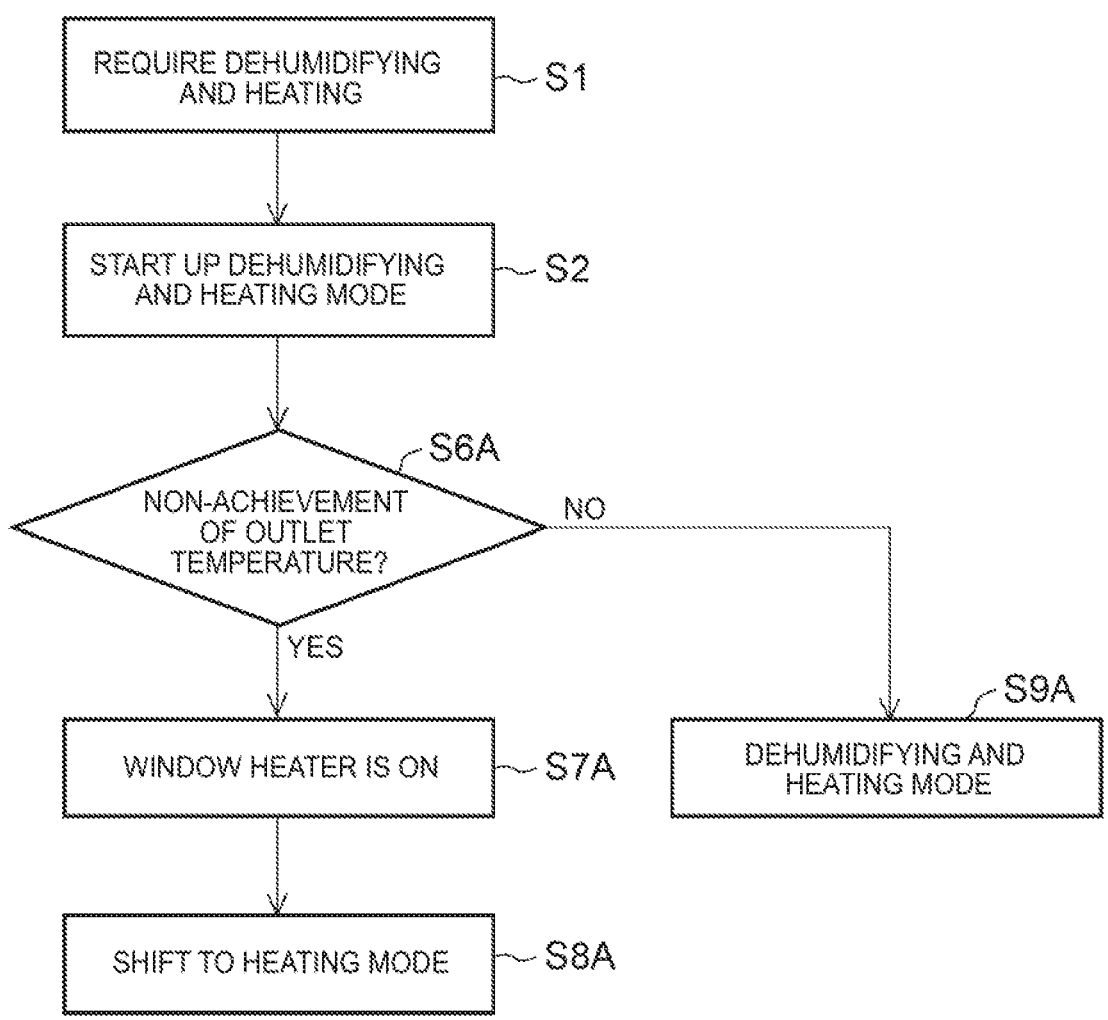

VEHICLE AIR-CONDITIONING APPARATUS

CROSS-REFERENCE TO RELATED APPLICATIONS

This application is a U.S. National Stage patent application under 37 U.S.C. § 371 of International Patent Application No. PCT/JP2017/029579, filed on Aug. 10, 2017, which claims the benefit of Japanese Patent Application No. JP 2016-172221, filed on Sep. 2, 2016, the disclosures of which are incorporated herein by reference in their entirety.

TECHNICAL FIELD

The present invention relates to an air conditioning apparatus of a heat pump system which conditions air of a vehicle interior of a vehicle, and particularly to a vehicle air-conditioning apparatus suitable for a hybrid car and an electric vehicle.

BACKGROUND ART

Due to actualization of environmental problems in recent years, hybrid cars and electric vehicles have spread. Then, as an air conditioning apparatus which is applicable to such a vehicle, there has been developed one which includes a compressor to compress and discharge a refrigerant, a radiator provided on the side of a vehicle interior to let the refrigerant radiate heat, a heat absorber provided on the vehicle interior side to let the refrigerant absorb heat, and an outdoor heat exchanger provided outside the vehicle interior to let the refrigerant radiate heat or absorb heat, and which makes it possible to change a heating mode to let the refrigerant discharged from the compressor radiate heat in the radiator and let the refrigerant from which the heat has been radiated in this radiator absorb heat in the outdoor heat exchanger, a dehumidifying and heating mode to let the refrigerant discharged from the compressor radiate heat in the radiator and let the refrigerant from which the heat has been radiated in the radiator absorb heat in the heat absorber and the outdoor heat exchanger, a dehumidifying and cooling mode to let the refrigerant discharged from the compressor radiate heat in the radiator and the outdoor heat exchanger and let the refrigerant absorb heat in the heat absorber, and a cooling mode to let the refrigerant discharged from the compressor radiate heat in the outdoor heat exchanger and let the refrigerant absorb heat in the heat absorber (e.g., see Patent Document 1).

In this case, in Patent Document 1, an outdoor expansion valve is provided in an inlet of the outdoor heat exchanger, and an indoor expansion valve is provided in an inlet of the heat absorber. Further, a bypass circuit is provided in parallel with a series circuit of the outdoor expansion valve and the outdoor heat exchanger. Then, in the above-mentioned dehumidifying and heating mode, the refrigerant flowing through the radiator is distributed, a part of the refrigerant is made to flow from the bypass circuit to the indoor expansion valve, where the refrigerant is decompressed, and then made to flow into the heat absorber to absorb heat. Furthermore, the residual refrigerant is made to flow through the outdoor expansion valve, where the refrigerant is decompressed and then made to flow into the outdoor heat exchanger to absorb heat.

Additionally, in such a dehumidifying and heating mode, an operation of the compressor is controlled on the basis of a radiator pressure to control a heating capability by the radiator, and the outdoor expansion valve is controlled on the basis of a temperature of the heat absorber to control a dehumidifying capability (a cooling capability) by the heat absorber. That is, when the temperature of the heat absorber becomes lower than a target heat absorber temperature, a valve position of the outdoor expansion valve is expanded to decrease an amount of the refrigerant to flow from the bypass circuit to the heat absorber. Conversely, when the temperature of the heat absorber becomes higher, the valve position of the outdoor expansion valve is reduced to increase an amount of the refrigerant to flow into the heat absorber from the bypass circuit through the indoor expansion valve. Thus, the vehicle interior is dehumidified while being heated to thereby eliminate or suppress fogging of a vehicle window (front window or the like).

CITATION LIST

Patent Documents

Patent Document 1: Japanese Patent Application Publication No. 2014-213765
Patent Document 2: Japanese Patent Application Publication No. 2014-8858

SUMMARY OF THE INVENTION

Problems to be Solved by the Invention

As described above, in Patent Document 1, the temperature of the heat absorber in the dehumidifying and heating mode has been controlled in accordance with the valve position of the outdoor expansion valve. Since, however, the temperature of the heat absorber falls below a target heat absorber temperature even when the outdoor expansion valve is expanded to its maximum position in an environment where an outdoor air temperature falls, for example, there is the risk that the temperature (an outlet temperature) of air to be blown to the vehicle interior is lowered. This problem involves a risk generated in common where when performing the dehumidifying and heating mode to let the refrigerant radiate heat in not only the refrigerant circuit as in Patent Document 1 but also the radiator and let the refrigerant absorb heat in the heat absorber, the operation of the compressor is controlled on the basis of, for example, the radiator pressure without depending on the temperature of the heat absorber.

Therefore, in Patent Document 1, an evaporation pressure adjustment valve (called an evaporation capability control valve in Patent Document 1) is attached to a refrigerant outlet side of the heat absorber, and in such a situation, this evaporation pressure adjustment valve is opened and closed to decrease an amount of the refrigerant to flow into the heat absorber. However, this evaporation pressure adjustment valve has the defect that the valve is comparatively expensive. Further, it is also considered that when auxiliary heating means is provided as in Patent Document 1, the air to be blown out to the vehicle interior is heated by the auxiliary heating means. In that case, however, since a high output electric heater (a PTC heater or the like) large in its generated heat amount is required, its improvement has been desired.

On the other hand, the trend to attach a fog suppressing device (a window heater) constituted of an electric heater to a windshield (also referred to as a front window or a front glass) has recently been on the rise (e.g., see Patent Document 2).

The present invention has been developed to solve such conventional technical problems, and an object thereof is to provide a vehicle air-conditioning apparatus which is capable of efficiently eliminating or suppressing fogging of a window while comfortably heating a vehicle interior.

Means for Solving the Problems

The vehicle air-conditioning apparatus of the invention of claim 1 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger provided outside the vehicle interior to let the refrigerant absorb heat, a window heating device to heat a window of a vehicle, and a control device, whereby the control device changes and executes at least a heating mode to let the refrigerant discharged from the compressor radiate heat in the radiator and let the refrigerant absorb heat in the outdoor heat exchanger to heat the vehicle interior, and a dehumidifying and heating mode to let the refrigerant discharged from the compressor radiate heat in the radiator and let the refrigerant absorb heat in the heat absorber to execute dehumidifying and heating of the vehicle interior, and the vehicle air-conditioning apparatus is characterized in that in the dehumidifying and heating mode, when the temperature of the air blown out to the vehicle interior is not capable of being reached a target value, the control device actuates the window heating device and shifts to the heating mode.

The vehicle air-conditioning apparatus of the invention of claim 2 is characterized in that in the above invention, the control device controls the operation of the compressor on the basis of a pressure of the radiator in the heating mode and the dehumidifying and heating mode, A vehicle air-conditioning apparatus of the invention of claim 3 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger provide outside the vehicle interior to let the refrigerant absorb heat, an outdoor expansion valve to decompress the refrigerant flowing into the outdoor heat exchanger, a bypass circuit connected in parallel with a series circuit of the outdoor heat exchanger and the outdoor expansion valve, an indoor expansion valve to decompress the refrigerant flowing into the heat absorber, a window heating device to heat a window of a vehicle, and a control device, whereby the control device changes and executes at least a heating mode to let the refrigerant discharged from the compressor radiate heat in the radiator, let the heat-radiated refrigerant flow into the outdoor heat exchanger through the outdoor expansion valve, and let the refrigerant absorb heat in the outdoor heat exchanger to heat the vehicle interior, and a dehumidifying and heating mode to let the refrigerant discharged from the compressor radiate heat in the radiator, distribute the heat-radiated refrigerant, let a part of the refrigerant flow from the bypass circuit to the heat absorber through the indoor expansion valve, let the refrigerant absorb heat in the heat absorber, let the residual refrigerant flow into the outdoor heat exchanger through the outdoor expansion valve, and let the refrigerant absorb heat in the outdoor heat exchanger to execute dehumidifying and heating of the vehicle interior, and the vehicle air-conditioning apparatus is characterized in that in the dehumidifying and heating mode, the control device controls an operation of the compressor on the basis of a pressure of the radiator and controls a valve position of the outdoor expansion valve on the basis of a temperature of the heat absorber, and when the temperature of the air blown out to the vehicle interior is not capable of being reached a target value, the control device actuates the window heating device and shifts to the heating mode.

A vehicle air-conditioning apparatus of the invention of claim 4 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger provided outside the vehicle interior to let the refrigerant absorb heat, an outdoor expansion valve to decompress the refrigerant flowing into the outdoor heat exchanger, a bypass circuit connected in parallel with a series circuit of the outdoor heat exchanger and the outdoor expansion valve, an indoor expansion valve to decompress the refrigerant flowing into the heat absorber, an auxiliary heating device to heat the air to be supplied from the air flow passage to the vehicle interior, a window heating device to heat a window of a vehicle, and a control device, whereby the control device changes and executes at least a heating mode to let the refrigerant discharged from the compressor radiate heat in the radiator, let the heat-radiated refrigerant flow into the outdoor heat exchanger through the outdoor expansion valve, and let the refrigerant absorb heat in the outdoor heat exchanger to heat the vehicle interior, and a dehumidifying and heating mode to let the refrigerant discharged from the compressor radiate heat in the radiator, distribute the refrigerant from which the heat has been radiated, let a part of the refrigerant flow from the bypass circuit to the heat absorber through the indoor expansion valve, let the refrigerant absorb heat in the heat absorber, let the residual refrigerant flow into the outdoor heat exchanger through the outdoor expansion valve, and let the refrigerant absorb heat in the outdoor heat exchanger to execute dehumidifying and heating of the vehicle interior, and the vehicle air-conditioning apparatus is characterized in that in the dehumidifying and heating mode, the control device executes a normal dehumidifying and heating mode to control an operation of the compressor on the basis of a pressure of the radiator and control a valve position of the outdoor expansion valve on the basis of a temperature of the heat absorber, and in the normal dehumidifying and heating mode, when the temperature of the heat absorber is lowered to a predetermined value or below even by the control of the outdoor expansion valve, the control device shifts to a heating auxiliary dehumidifying and heating mode to control the operation of the compressor on the basis of the temperature of the heat absorber and actuate the auxiliary heating device, and in that in the heating auxiliary dehumidifying and heating mode, when the temperature of the air blown out to the vehicle interior is not capable of being reached a target value, the control device actuates the window heating device and shifts to the heating mode.

The vehicle air-conditioning apparatus of the invention of claim 5 is characterized in that in the invention of claim 3 or 4, in the heating mode, the control device controls the operation of the compressor on the basis of the pressure of the radiator and controls the valve position of the outdoor expansion valve on the basis of a temperature and the pressure of the radiator.

The vehicle air-conditioning apparatus of the invention of claim 6 is characterized in that in the above respective inventions, an evaporation pressure adjustment valve is not provided on a refrigerant outlet side of the heat absorber.

Advantageous Effect of the Invention

According to the present invention, when the temperature of air blown out to a vehicle interior is not capable of reaching a target value in a dehumidifying and heating mode (the inventions of claims 1 and 3) and a heating auxiliary dehumidifying and heating mode (the invention of claim 4) when a window heating device to heat a window of a vehicle is provided, the window heating device is actuated to shift to a heating mode. Therefore, under the condition that it is not possible to make the temperature of the air blown out to the vehicle interior to be reached the target value due to the fall of an outdoor air temperature or the like, an operation mode is shifted to the heating mode, and the window of the vehicle can be heated by the window heating device while maintaining the temperature of the air blown out to the vehicle interior at the target value. Thus, the fog of the window of the vehicle can also be eliminated or suppressed effectively while comfortably heating the vehicle interior. Further, since there is no need to provide a high output auxiliary heating device in order to heat the air blown out to the vehicle interior, it is possible to efficiently eliminate or suppress the fog of the window of the vehicle.

These are effective where the operation of a compressor is controlled on the basis of a pressure of a radiator in the dehumidifying and heating mode and the heating mode as in the inventions of claim 2, claim 3, and claim 5, and particularly effective where as in the invention of claim 3, a bypass circuit is provided, and a valve position of an outdoor expansion valve is controlled on the basis of a temperature of a heat absorber in the dehumidifying and heating mode.

Further, as in the invention of claim 4, an auxiliary heating device to heat air to be supplied from an air flow passage to a vehicle interior is further provided. When the temperature of a heat absorber is lowered to a predetermined value or below even by control of an outdoor expansion valve when a control device executes a normal dehumidifying and heating mode to control an operation of a compressor on the basis of a pressure of a radiator and control a valve position of the outdoor expansion valve on the basis of the temperature of the heat absorber, the control device controls the operation of the compressor on the basis of the temperature of the heat absorber and shifts to a heating auxiliary dehumidifying and heating mode to actuate the auxiliary heating device. Consequently, when the temperature fall of the heat absorber cannot be obstructed in accordance with the control of the valve position of the outdoor expansion valve in the normal dehumidifying and heating mode due to the fall of an outdoor air temperature, or the like, the control device shifts to the heating auxiliary dehumidifying and heating mode to control the temperature of the heat absorber by control of the operation of the compressor, thereby making it possible to prevent the temperature fall of the heat absorber. On the other hand, when the control device controls the operation of the compressor in accordance with the temperature of the heat absorber, a temperature of the radiator cannot be controlled, but a temperature of the air to be blown out to the vehicle interior can also be maintained by actuating the auxiliary heating device.

Then, when the temperature of the air blown out to the vehicle interior cannot be reached a target value due to a further fall in outdoor air temperature or the like even in this heating auxiliary dehumidifying and heating mode, the control device actuates the window heating device to shift to the heating mode. Therefore, the fog of the window of the vehicle can also be effectively eliminated or suppressed while comfortably heating the vehicle interior as mentioned above. Particularly, in this case, since it is not necessary to use a high output one as the auxiliary heating device, it is possible to efficiently eliminate or suppress the fog of the window of the vehicle.

Further, for these reasons, it is possible to remove the evaporation pressure adjustment valve which has heretofore been provided on the refrigerant outlet side of the heat absorber as in the invention of claim 6, and hence a cost reduction can also be achieved.

BRIEF DESCRIPTION OF THE DRAWINGS

FIG. 9 is a diagram to explain control of a dehumidifying and heating mode by a controller of the vehicle air-conditioning apparatus of FIG. 8.

MODE FOR CARRYING OUT THE INVENTION

Hereinafter, description will be made as to embodiments of the present invention in detail based on the drawings.

Embodiment 1

Figure 1:
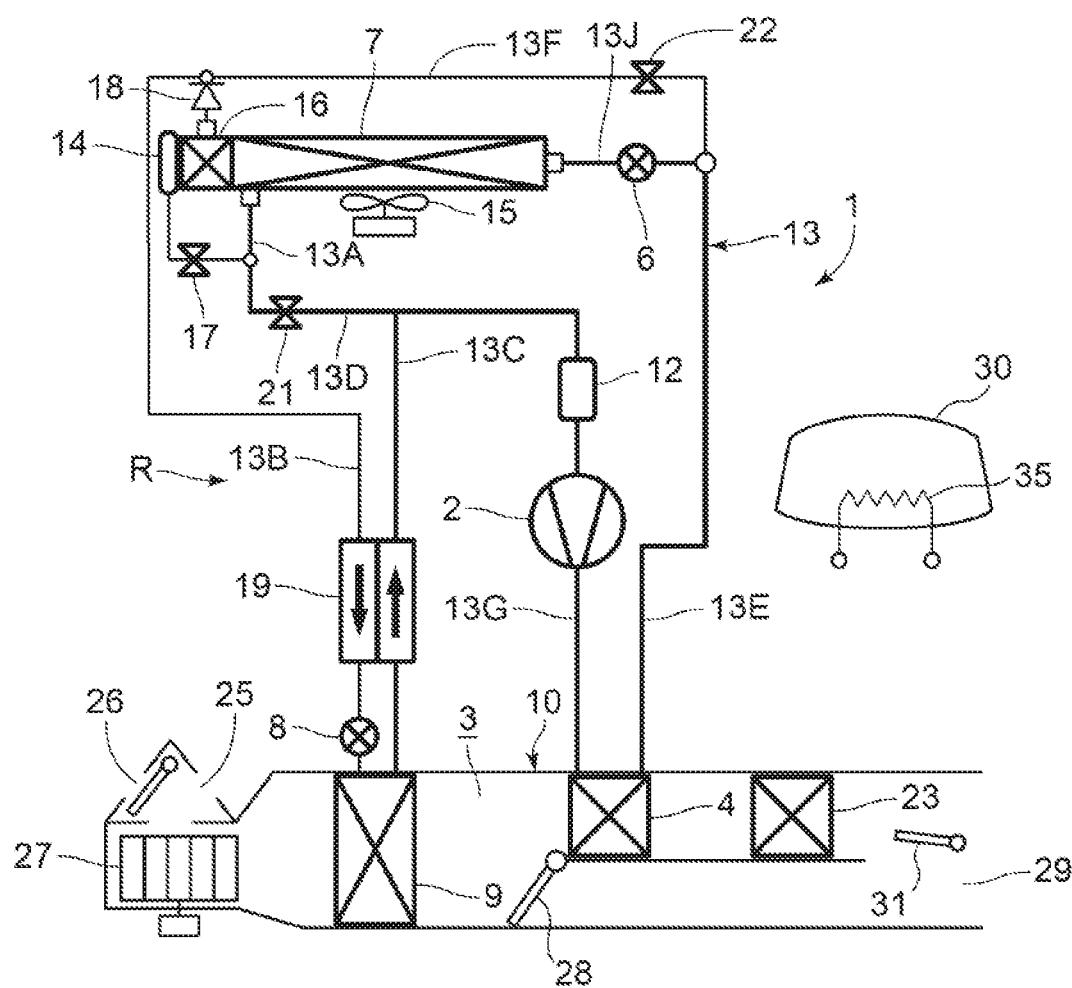
FIG. 1 is a constitutional view of a vehicle air-conditioning apparatus of an embodiment to which the present invention is applied (Embodiment 1)

FIG. 1 shows a constitutional view of a vehicle air-conditioning apparatus 1 of an embodiment to which the present invention is applied. A vehicle of the embodiment to which the present invention is applied is an electric vehicle (EV) in which an engine (an internal combustion engine) is not mounted, and runs with an electric motor for running which is driven by power charged in a battery (both being not shown in the drawing). The vehicle air-conditioning apparatus 1 of the present invention is also driven by the power of the battery. That is, in the electric vehicle which is not capable of performing heating by engine waste heat, the vehicle air-conditioning apparatus 1 of the embodiment performs a heating mode by a heat pump operation in which a refrigerant circuit is used, and further selectively executes respective operation modes of a dehumidifying and heating mode, an internal cycle mode, a dehumidifying and cooling mode, and a cooling mode.

Incidentally, it is needless to say that the present invention is effective for, as the vehicles, not only the electric vehicle but also a so-called hybrid car in which the engine and the electric motor for running are commonly used, and is further applicable even to a usual car which runs with the engine.

The vehicle air-conditioning apparatus 1 of the embodiment performs air conditioning (heating, cooling, dehumidifying, and ventilation) of a vehicle interior of the electric vehicle. An electric type of compressor 2 to compress a refrigerant, a radiator 4 provided in an air flow passage 3 of an HVAC unit 10 in which vehicle interior air is ventilated and circulated, to let the high-temperature high-pressure refrigerant discharged from the compressor 2 flow therein via a refrigerant pipe 13G and to let the refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve to decompress and expand the refrigerant, a heat absorber 9 provided in the air flow passage 3 to let the refrigerant absorb heat from interior and exterior of the vehicle during the cooling and during the dehumidifying, an accumulator 12, and others are successively connected by a refrigerant pipe 13, whereby a refrigerant circuit R is constituted.

Incidentally, an outdoor blower 15 is provided in the outdoor heat exchanger 7. The outdoor blower 15 forcibly passes the outdoor air through the outdoor heat exchanger 7 to perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier portion 14 and a subcooling portion 16 successively on a refrigerant downstream side. A refrigerant pipe 13A connected to a refrigerant outlet of the outdoor heat exchanger 7 is connected to the receiver drier portion 14 via a solenoid valve 17 (an opening/closing valve) to be opened during the cooling, and an outlet of the subcooling portion 16 is connected to the indoor expansion valve 8 via a check valve 18. Incidentally, the receiver drier portion 14 and the subcooling portion 16 structurally constitute a part of the outdoor heat exchanger 7, and an indoor expansion valve 8 side of the check valve 18 serves as a forward direction.

Furthermore, a refrigerant pipe 13B between the check valve 18 and the indoor expansion valve 8 is provided in a heat exchange relation with a refrigerant pipe 13C positioned on an outlet side of the heat absorber 9, and both the pipes constitute an internal heat exchanger 19. In consequence, the refrigerant flowing into the indoor expansion valve 8 through the refrigerant pipe 13B is made to be cooled (subcooled) by the low-temperature refrigerant flowing out from the heat absorber 9.

In addition, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 (an opening/closing valve) to be opened during the heating. The refrigerant pipe 13C is connected to the accumulator 12, and the accumulator 12 is connected to a refrigerant suction side of the compressor 2.

Furthermore, a refrigerant pipe 13E on an outlet side of the radiator 4 branches to a refrigerant pipe 13J and a refrigerant pipe 13F before the outdoor expansion valve 6, and one branching refrigerant pipe 13J is connected to a refrigerant inlet of the outdoor heat exchanger 7 via the outdoor expansion valve 6. Also, the other branching refrigerant pipe 13F communicates with and is connected to the refrigerant pipe 13B on a downstream side of the check valve 18 via a solenoid valve 22 (an opening/closing valve) to be opened during the dehumidifying. Consequently, the refrigerant pipe 13F is formed to be connected in parallel with a series circuit of the outdoor expansion valve 6 and the outdoor heat exchanger 7, to constitute a bypass circuit in the present invention. The solenoid valve 22 is connected to the middle of the bypass circuit (the refrigerant pipe 13F).

Additionally, in the air flow passage 3 on an air upstream side of the heat absorber 9, respective suction ports such as an outdoor air suction port and an indoor air suction port are formed (shown as a representative by a suction port 25 in FIG. 1). There is provided in the suction port 25, a suction changing damper 26 to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 for supplying the introduced indoor or outdoor air to the air flow passage 3 is provided.

Furthermore, in FIG. 1, 23 denotes an auxiliary heater as an auxiliary heating device provided in the vehicle air-conditioning apparatus 1 of the embodiment. The auxiliary heater 23 is constituted of a PTC heater (an electric heater) in the embodiment, and provided in the air flow passage 3 which is on an air downstream side of the radiator 4 to the flow of the air in the air flow passage 3. Then, when the auxiliary heater 23 (auxiliary heating device) is energized to generate heat (operate), the auxiliary heater becomes a so-called heater core to complement heating of the vehicle interior. Thus, when the auxiliary heater 23 is disposed on the downstream side of the radiator 4 to the flow of the air in the air flow passage 3, there is eliminated the disadvantage that the radiator 4 absorbs heat from the air warmed by the auxiliary heater 23. It is thus possible to avoid deterioration of an operation efficiency of the vehicle air-conditioning apparatus 1 in advance.

Additionally, in the air flow passage 3 on the air upstream side of the radiator 4, there is provided an air mix damper 28 to adjust a ratio at which the air (the indoor or outdoor air) in the air flow passage 3 flowing into the air flow passage 3 and passed through the heat absorber 9 is to be passed through the radiator 4 and the auxiliary heater 23. Furthermore, in the air flow passage 3 on the air downstream side of the auxiliary heater 23, there is formed each outlet (shown as a representative by an outlet 29 in FIG. 1) of FOOT (foot), VENT (vent) or DEF (defroster). In the outlet 29, there is provided an outlet changing damper 31 to execute changing control of blowing of the air from each outlet mentioned above.

Furthermore, there are provided in the vehicle, windows (a front window, a side window, and a rear window). In the embodiment, however, a window heater 35 serving as a window heating device is attached to the front window 30 of those windows. Incidentally, in the embodiment, the window heater 35 is constituted of a heating coil (heating wire)

of a heating coil-containing glass used as the front window 30 and is energized by control of a controller 32 to be descried later or a manual operation to an air conditioning operating portion 53 to generate heat (operate) and thereby to eliminate or suppress the fog of the front window 30 (in the manual operation, the window heater 35 is energized for e.g., a predetermined time to generate heat).

Figure 2:
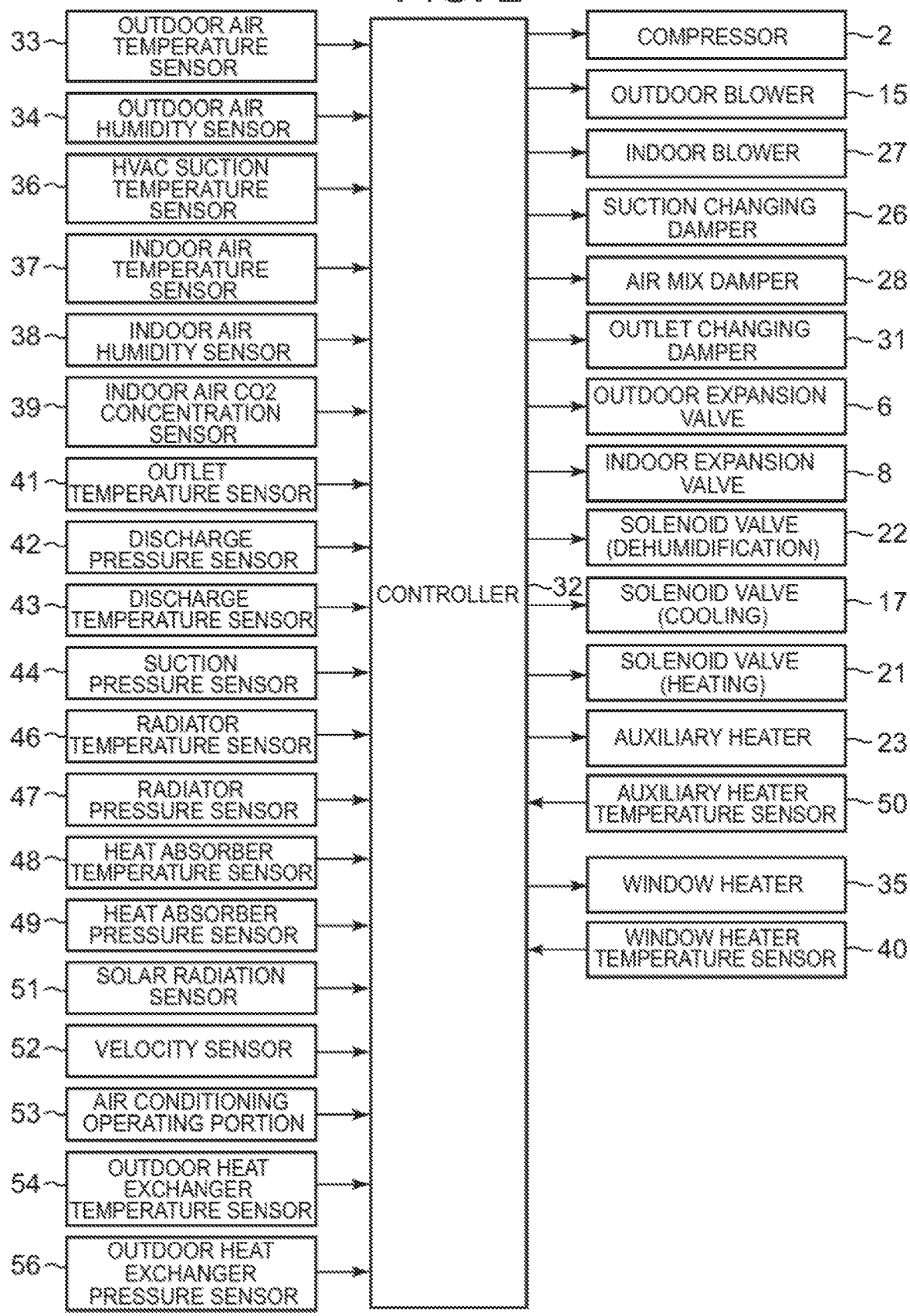
FIG. 2 is a block diagram of an electric circuit of a controller of the vehicle air-conditioning apparatus of FIG. 1.

Next, in FIG. 2, 32 is a controller (ECU) that is a control device. The controller 32 (control device) is constituted of a microcomputer as an example of a computer having a processor, and an input of the controller is connected with respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air (the indoor air) of the vehicle interior, an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature (outlet temperature TAI) of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction pressure sensor 44 which detects a pressure of the refrigerant to be sucked into the compressor 2, a radiator temperature sensor 46 which detects a temperature (the temperature of the air passed through the radiator 4 or the temperature of the radiator 4 itself: a radiator temperature TCI) of the radiator 4, a radiator pressure sensor 47 which detects a refrigerant pressure (the pressure of the refrigerant in the radiator 4 or immediately after the refrigerant flows out from the radiator 4: a radiator pressure PCI) of the radiator 4, a heat absorber temperature sensor 48 which detects a temperature (the temperature of the air passed through the heat absorber 9 or the temperature of the heat absorber 9 itself: a heat absorber temperature Te) of the heat absorber 9, a heat absorber pressure sensor 49 which detects a refrigerant pressure (the pressure of the refrigerant in the heat absorber 9 or immediately after the refrigerant flows out from the heat absorber 9) of the heat absorber 9, a solar radiation sensor 51 of, e.g., a photo sensor system to detect a solar radiation amount into the vehicle interior, a velocity sensor 52 to detect a moving speed (a vehicle velocity) of the vehicle, an air conditioning (aircon) operating portion 53 to set the changing of a predetermined temperature or the operation mode, an outdoor heat exchanger temperature sensor 54 which detects a temperature (the temperature of the refrigerant immediately after the refrigerant flows out from the outdoor heat exchanger 7, or the temperature of the outdoor heat exchanger 7 itself) of the outdoor heat exchanger 7, and an outdoor heat exchanger pressure sensor 56 which detects a refrigerant pressure (the pressure of the refrigerant in the outdoor heat exchanger 7 or immediately after the refrigerant flows out from the outdoor heat exchanger 7) of the outdoor heat exchanger 7.

Furthermore, the input of the controller 32 is also further connected with an output of an auxiliary heater temperature sensor 50 which detects a temperature (the temperature of the air passed through the auxiliary heater 23 or the temperature of the auxiliary heater 23 itself: an auxiliary heater temperature TSH) of the auxiliary heater 23, and an output of a window heater temperature sensor 40 to detect a temperature of the window heater.

On the other hand, an output of the controller 32 is connected with the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves of the solenoid valve 22 (dehumidification), the solenoid valve 17 (cooling) and the solenoid valve 21 (heating), the auxiliary heater 23, and the window heater 35. Then, the controller 32 controls these on the basis of the outputs of the respective sensors and the setting input by the air conditioning operating portion 53.

With the above constitution, an operation of the vehicle air-conditioning apparatus 1 of the embodiment will next be described. In the embodiment, the controller 32 changes and executes the respective operation modes of the heating mode, the dehumidifying and heating mode, the internal cycle mode, the dehumidifying and cooling mode, and the cooling mode. Description will initially be made as to a flow of the refrigerant in each operation mode.

(1) Flow of Refrigerant of Heating Mode

When the heating mode is selected by the controller 32 (an automatic mode) or a manual operation to the air conditioning operating portion 53 (a manual mode), the controller 32 opens the solenoid valve 21 (for the heating) and closes the solenoid valve 17. The controller also closes the solenoid valve 22.

Then, the controller operates the compressor 2 and the respective blowers 15 and 27, and the air mix damper 28 has a state of passing the air blown out from the indoor blower 27 through the radiator 4 and the auxiliary heater 23 (FIG. 1) Thus, a high-temperature high-pressure gas refrigerant discharged from the compressor 2 flows into the radiator 4. Since the air in the air flow passage 3 passes through the radiator 4, the air in the air flow passage 3 is heated by the high-temperature refrigerant in the radiator 4 (by the radiator 4 and the auxiliary heater 23 when the auxiliary heater 23 operates), whereas the refrigerant in the radiator 4 has the heat taken by the air and is cooled to condense and liquefy.

The refrigerant liquefied in the radiator 4 flows out from the radiator 4 and then reaches the outdoor expansion valve 6 through the refrigerant pipes 13E and 13J. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21, and the refrigerant pipe 13D, and flows from the refrigerant pipe 13C into the accumulator 12, where it is subjected to gas-liquid separation, followed by repetition of a circulation in which the gas refrigerant is sucked into the compressor 2. The air heated in the radiator 4 is blown out from the outlet 29 through the auxiliary heater 23, and hence the heating of the vehicle interior is performed.

The controller 32 calculates a target radiator pressure PCO (a target value of the radiator pressure PCI) from a target radiator temperature TCO (a target value of the temperature TCI of the radiator 4) calculated from an after-mentioned target outlet temperature TAO, and controls the number of revolutions of the compressor 2 on the basis of the target radiator pressure PCO and the refrigerant pressure (the radiator pressure PCI that is a high pressure of the refrigerant circuit R) of the radiator 4 which is detected by the radiator pressure sensor 47. Furthermore, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree (SC) of the refrigerant in an outlet of the radiator 4. The target radiator temperature TCO is basically TCO=TAO, but a predetermined limit of controlling is provided.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing into the refrigerant pipe 13E through the radiator 4 is distributed. This part of the refrigerant flows through the solenoid valve 22 into the refrigerant pipe 13F and flows from the refrigerant pipe 13B through the internal heat exchanger 19 into the indoor expansion valve 8, and the residual refrigerant flows through the outdoor expansion valve 6. That is, the distributed part of the refrigerant is decompressed by the indoor expansion valve 8, and then flows into the heat absorber 9 to evaporate.

The controller 32 controls the valve position of the indoor expansion valve 8 to maintain a superheat degree (SH) of the refrigerant in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time. Hence, the air is cooled and dehumidified. The distributed residual refrigerant flowing into the refrigerant pipe 13J is decompressed by the outdoor expansion valve 6, and then evaporates in the outdoor heat exchanger 7.

The refrigerant evaporated in the heat absorber 9 flows through the internal heat exchanger 19 to join the refrigerant (the refrigerant from the outdoor heat exchanger 7) from the refrigerant pipe 13D in the refrigerant pipe 13C, after that a circulation is repeated in which the refrigerant is sucked into the compressor 2 through the accumulator 12. The air dehumidified in the heat absorber 9 is reheated in a process of passing the radiator 4 (the radiator 4 and the auxiliary heater 23 when the auxiliary heater 23 generates heat), whereby the dehumidifying and heating of the vehicle interior are performed.

The controller 32 controls the number of revolutions of the compressor 2 on the basis of the target radiator pressure PCO calculated from the target radiator temperature TCO and the radiator pressure PCI (the high pressure of the refrigerant circuit R) detected by the radiator pressure sensor 47, and controls the valve position of the outdoor expansion valve 6 on the basis of the temperature (the heat absorber temperature Te) of the heat absorber 9 which is detected by the heat absorber temperature sensor 48. Description will be made later as to control of the compressor 2, the outdoor expansion valve 6 and the auxiliary heater 23 in this dehumidifying and heating mode.

(3) Flow of Refrigerant of Internal Cycle Mode

Next, in the internal cycle mode, the controller 32 fully closes the outdoor expansion valve 6 in the above state of the dehumidifying and heating mode (a full close position), and closes the solenoid valve 21. That is, since this internal cycle mode is a state in which the outdoor expansion valve 6 is fully closed under the control of the outdoor expansion valve 6 in the dehumidifying and heating mode, this internal cycle mode is grasped as a part of the dehumidifying and heating mode in the present invention.

However, the outdoor expansion valve 6 and the solenoid valve 21 are closed, thereby obstructing inflow of the refrigerant into the outdoor heat exchanger 7 and outflow of the refrigerant from the outdoor heat exchanger 7. Hence, all the condensed refrigerant flowing through the radiator 4 into the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed by the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

A circulation is repeated in which the refrigerant evaporated in the heat absorber 9 flows into the refrigerant pipe 13C through the internal heat exchanger 19 and flows through the accumulator 12 to be sucked into the compressor 2. The air dehumidified by the heat absorber 9 is reheated in the process of passing the radiator 4, whereby the dehumidifying and heating of the vehicle interior are performed. In this internal cycle mode, however, the refrigerant circulates between the radiator 4 (heat radiation) and the heat absorber 9 (heat absorption) which are present in the air flow passage 3 on an indoor side, and hence, the heat is not pumped up from the outdoor air, but the heating capability for a consumed power of the compressor 2 is exerted. Since the whole amount of the refrigerant flows through the heat absorber 9 which exerts a dehumidifying operation, a dehumidifying capability is high, but the heating capability becomes low as compared with the above dehumidifying and heating mode.

The controller 32 controls the number of revolutions of the compressor 2 on the basis of the temperature of the heat absorber 9 or the above-mentioned radiator pressure PCI (the high pressure of the refrigerant circuit R). At this time, the controller 32 selects a lower compressor target number of revolutions obtainable by either of calculations from the temperature of the heat absorber 9 and the radiator pressure PCI to control the compressor 2.

(4) Flow of Refrigerant of Dehumidifying and Cooling Mode

Next, in the dehumidifying and cooling mode, the controller 32 opens the solenoid valve 17 and closes the solenoid valve 21. Also, the controller closes the solenoid valve 22. Then, the controller operates the compressor 2 and the respective blowers 15 and 27, and the air mix damper 28 has the state of passing the air blown out from the indoor blower 27 through the radiator 4. Consequently, the high-temperature high-pressure gas refrigerant discharged from the compressor 2 flows into the radiator 4. Since the air in the air flow passage 3 passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows into the outdoor heat exchanger 7 through the outdoor expansion valve 6 controlled to slightly open. The refrigerant flowing into the outdoor heat exchanger 7 is cooled by the running therein or the outdoor air passed through the outdoor blower 15 and then condensed. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and reaches the indoor expansion valve 8 through the internal heat exchanger 19. The refrigerant is decompressed by the indoor expansion valve 8 and then flows into the heat absorber 9 to evaporate. Since the water in the air blown out from the indoor blower 27 coagulates to adhere to the heat absorber 9 by the heat absorbing operation at this time, the air is cooled and dehumidified.

A circulation is repeated in which the refrigerant evaporated in the heat absorber 9 flows through the internal heat exchanger 19 and reaches the accumulator 12 via the refrigerant pipe 13C, and flows therethrough to be sucked into the compressor 2. The air cooled and dehumidified in the heat absorber 9 is reheated in the process of passing the radiator 4 (a radiation capability is lower than that during the heating), whereby the dehumidifying and cooling of the vehicle interior are performed.

The controller 32 controls the number of revolutions of the compressor 2 on the basis of the temperature (the heat absorber temperature Te) of the heat absorber 9 which is detected by the heat absorber temperature sensor 48, and controls the valve position of the outdoor expansion valve 6 on the basis of the above-mentioned high pressure of the refrigerant circuit R to control the refrigerant pressure (the radiator pressure PCI) of the radiator 4.

(5) Flow of Refrigerant of Cooling Mode

Next, in the cooling mode, the controller 32 fully opens the valve position of the outdoor expansion valve 6 in the above state of the dehumidifying and cooling mode. Incidentally, the air mix damper 28 has a state in which the air does not pass through the radiator 4. However, even when the air slightly passes, there are no problems.

Thus, the high-temperature high-pressure gas refrigerant discharged from the compressor 2 flows into the radiator 4. Since the air in the air flow passage 3 is not passed through the radiator 4, the refrigerant only passes the radiator. The refrigerant flowing out from the radiator 4 flows through the refrigerant pipe 13E to reach the outdoor expansion valve 6. At this time, the outdoor expansion valve 6 is fully opened, and hence, the refrigerant flows through the outdoor expansion valve 6 to pass the refrigerant pipe 13J, and flows into the outdoor heat exchanger 7 as it is, where the refrigerant is cooled by the running therein or the outdoor air blown by the outdoor blower 15 to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B through the check valve 18, and reaches the indoor expansion valve 8 through the internal heat exchanger 19. The refrigerant is decompressed by the indoor expansion valve 8 and then flows into the heat absorber 9 to evaporate. Since the water in the air blown out from the indoor blower 27 coagulates to adhere to the heat absorber 9 by the heat absorbing operation at this time, the air is cooled.

A circulation is repeated in which the refrigerant evaporated in the heat absorber 9 flows through the internal heat exchanger 19 and reaches the accumulator 12 via the refrigerant pipe 13C, and flows therethrough to be sucked into the compressor 2. The air cooled and dehumidified by the heat absorber 9 does not pass the radiator 4, but is blown out from the outlet 29 to the vehicle interior, whereby the cooling of the vehicle interior is performed. In this cooling mode, the controller 32 controls the number of revolutions of the compressor 2 on the basis of the temperature (the heat absorber temperature Te) of the heat absorber 9 which is detected by the heat absorber temperature sensor 48.

(6) Changing of Operation Mode

The controller 32 calculates the above-mentioned target outlet temperature TAO from the following equation (I). The target outlet temperature TAO is a target value of the outlet temperature TAI being the temperature of the air to be blown out from the outlet 29 to the vehicle interior.

$$TAO=(Tset-Tin)\times K+Tbal(f(Tset,SUN,Tam))  \quad (I),$$

where Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the target outlet temperature TAO is lowered with rising of the outdoor air temperature Tam.

Then, the controller 32 selects any operation mode from the above respective operation modes on the basis of the outdoor air temperature Tam detected by the outdoor air temperature sensor 33 and the target outlet temperature TAO on startup. Further, after the startup, the controller selects and changes the above respective operation modes in accordance with changes of environments and setting conditions such as the outdoor air temperature Tam and the target outlet temperature TAO.

(7) Auxiliary Heating by Auxiliary Heater

Furthermore, when the controller 32 judges that the heating capability by the radiator 4 runs short in the heating mode, the controller energizes the auxiliary heater 23 to generate heat, thereby executing the heating by the auxiliary heater 23. When the auxiliary heater 23 generates heat, the auxiliary heater 23 further heats the air in the air flow passage 3, which passes the radiator 4.

Consequently, when the heating capability generable by the radiator 4 runs short to the required heating capability (calculated from a difference between the target radiator temperature TCO obtainable from the target outlet temperature TAO and the heat absorber temperature Te), the auxiliary heater 23 complements this shortage of the heating capability. Incidentally, this auxiliary heater 23 is also energized in the dehumidifying and heating mode in the present invention, and this will next be described in detail.

(8) Control of Compressor 2, Outdoor Expansion Valve 6 and Auxiliary Heater 23 in Dehumidifying and Heating Mode Next, description will be made as to the number of revolutions NC of the compressor 2, the valve position of the outdoor expansion valve 6, and energization control of the auxiliary heater 23 in the above-mentioned dehumidifying and heating mode while referring to FIG. 3 to FIG. 6. The controller 32 changes and executes a normal dehumidifying and heating mode and a heating auxiliary dehumidifying and heating mode in the dehumidifying and heating mode in this embodiment.

Figure 6:
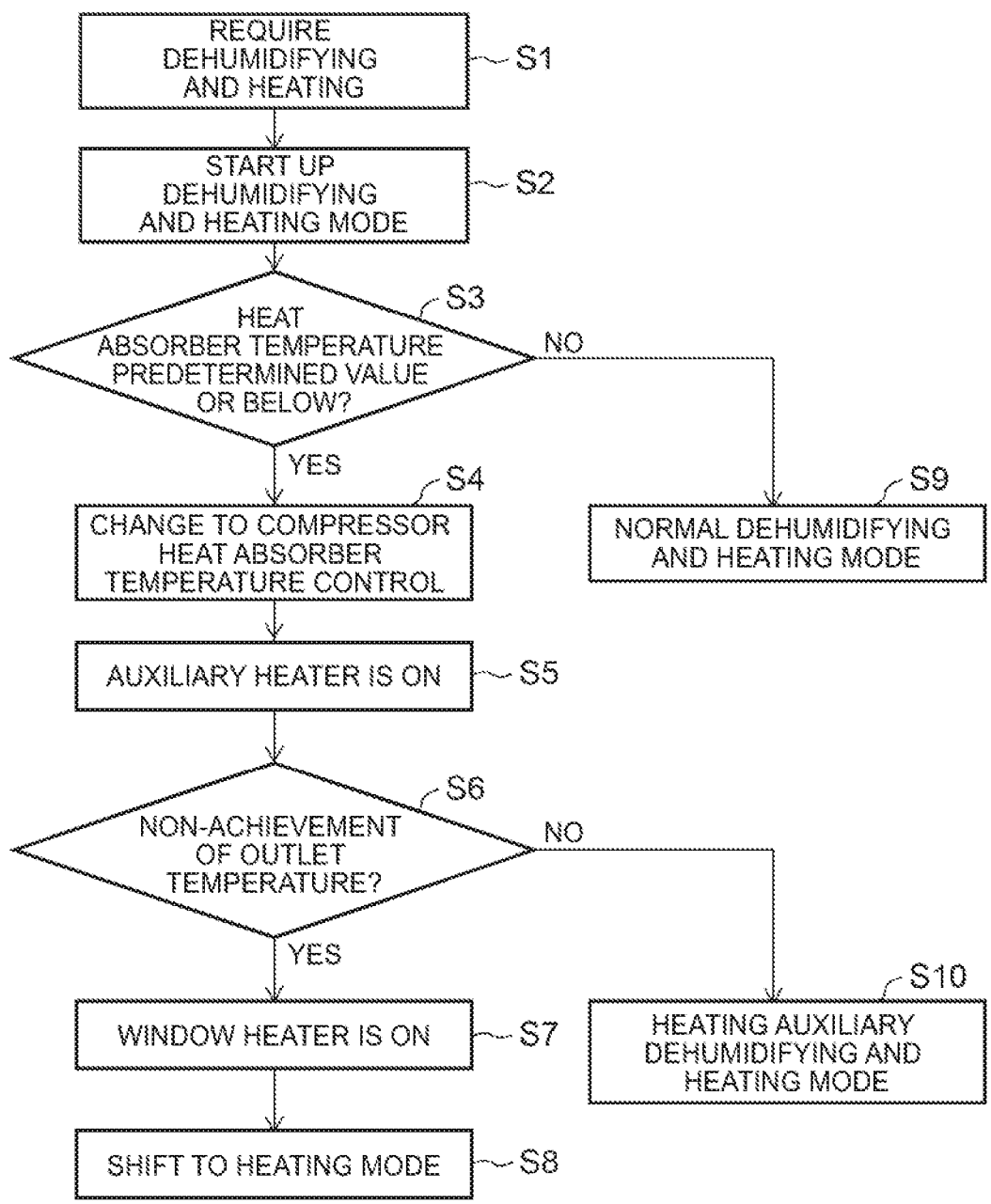
FIG. 6 is a flowchart to explain control of a dehumidifying and heating mode by the controller of FIG. 2.

When the dehumidifying and heating mode is assumed to be required in the auto mode of the controller 32 in Step S1 of the flowchart of FIG. 6, the controller 32 starts operating (startup) with the operation mode as the dehumidifying and heating mode in Step S2. Next, in Step S3, the controller 32 determines whether the heat absorber temperature Te detected by the heat absorber temperature sensor 48 becomes a preset predetermined value Telo or below lower than a target heat absorber temperature TEO, and its state is continued for a predetermined time. Then, in Step S3, when the condition that the heat absorber temperature Te is the predetermined value Telo or below, and the predetermined time elapses is not established, the controller 32 proceeds to Step S9 to execute the normal humidifying and heating mode.

(8-1) Normal Dehumidifying and Heating Mode

Figure 3:
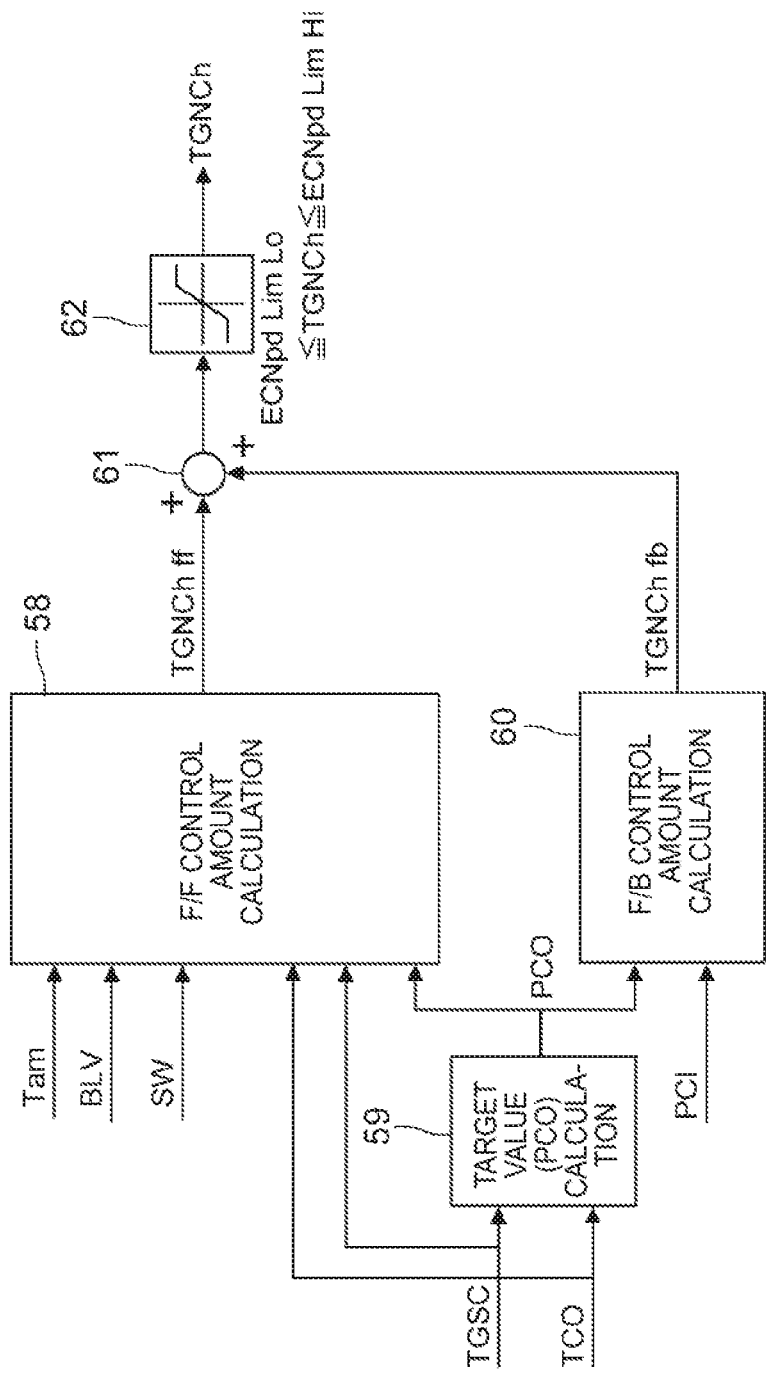
FIG. 3 is a control block diagram concerning compressor control of the controller of FIG. 2.
Figure 4:
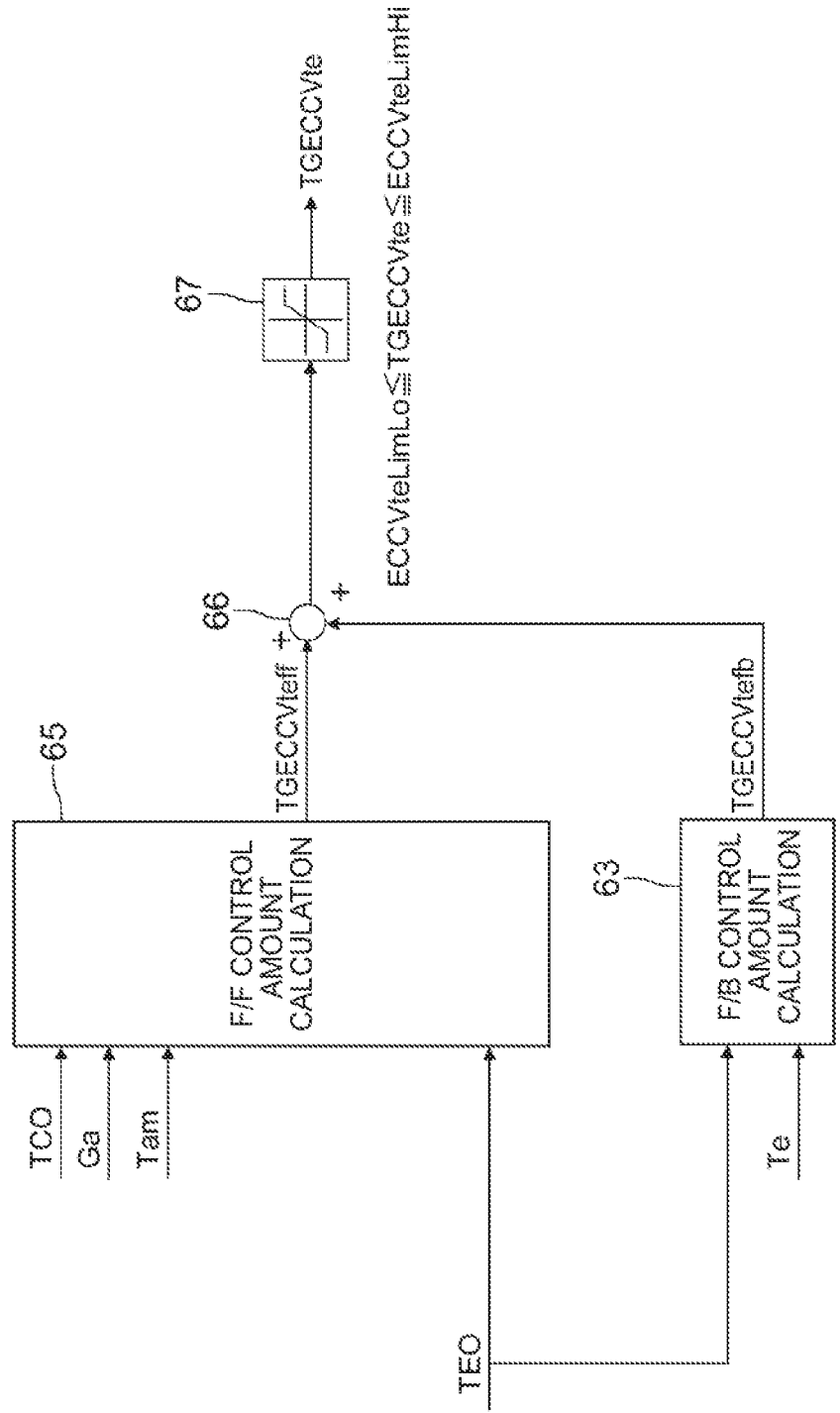
FIG. 4 is a control block diagram concerning outdoor expansion valve control of the controller of FIG. 2.

FIG. 3 and FIG. 4 respectively show a control block diagram of the compressor 2 and the outdoor expansion valve 6 in this normal dehumidifying and heating mode. FIG. 3 is a control block diagram of the controller 32 which determines a target number of revolutions (a compressor target number of revolutions) TGNCh of the compressor 2 of the heating mode and the normal dehumidifying and heating mode in the dehumidifying and heating mode. An F/F (feedforward) control amount calculation section 58 of the controller 32 calculates an F/F control amount TGNChff of the compressor target number of revolutions on the basis of the outdoor air temperature Tam obtainable from the outdoor air temperature sensor 33, a blower voltage BLV of the indoor blower 27, an air mix damper position SW of the air mix damper 28 which is obtainable from SW=(TAO−Te)/(TCI−Te), a target subcool degree TGSC that is a target value of a subcool degree SC in the outlet of the radiator 4, the above-mentioned target radiator temperature TCO that is the target value of the temperature of the radiator 4, and the target radiator pressure PCO that is the target value of the pressure of the radiator 4.

Incidentally, the air mix damper position SW changes in a range of 0≤SW≤1, 0 indicates an air mix fully closed state where the air does not pass through the radiator 4 and the auxiliary heater 23, and 1 indicates an air mix fully opened state where all the air in the air flow passage 3 passes through the radiator 4 and the auxiliary heater 23.

A target value calculation section 59 calculates the target radiator pressure PCO on the basis of the above-mentioned target subcool degree TGSC and target radiator temperature TCO. Further, an F/B (feedback) control amount calculation section 60 calculates an F/B control amount TGNChfb of the compressor target number of revolutions on the basis of the target radiator pressure PCO and the radiator pressure PCI that is the refrigerant pressure of the radiator 4. Then, an adder 61 adds the F/F control amount TGNCnff calculated by the F/F control amount calculation section 58 and TGNChfb calculated by the F/B control amount calculation section 60. A limit setting section 62 attaches limits of an upper limit of controlling and a lower limit of controlling, and then determines a result thereof as the compressor target number of revolutions TGNCh. In the normal dehumidifying and heating mode, the controller 32 controls the number of revolutions NC of the compressor 2 on the basis of the compressor target number of revolutions TGNCh.

That is, in this normal dehumidifying and heating mode, the controller 32 calculates the compressor target number of revolutions TGNCh and controls the number of revolutions NC of the compressor 2 so that the radiator pressure PCI reaches the target radiator pressure PCO, on the basis of the radiator pressure PCI and the target radiator pressure PCO.

Further, in the normal dehumidifying and heating mode, the auxiliary heater 23 is not energized (OFF).

Next, FIG. 4 is a control block diagram of the controller 32 which determines a target position (an outdoor expansion valve target position) TGECCVte of the outdoor expansion valve 6 in the normal dehumidifying and heating mode. An F/F control amount calculation section 65 of the controller 32 calculates an F/F control amount TGECCVteff of the outdoor expansion valve target position on the basis of the target heat absorber temperature TEO of the heat absorber 9, the target radiator temperature TCO, a mass air volume Ga of the air, and the outdoor air temperature Tam.

Further, an F/B control amount calculation section 63 calculates an F/B control amount TGECCVtefb of the outdoor expansion valve target position on the basis of the target heat absorber temperature TEO and the heat absorber temperature Te. Then, an adder 66 adds the F/F control amount TGECCVteff calculated by the F/F control amount calculation section 65 and the F/B control amount TGECCVtefb calculated by the F/B control amount calculation section 63. A limit setting section 67 attaches limits of an upper limit of controlling and a lower limit of controlling, and then determines a result thereof as the outdoor expansion valve target position TGECCVte. In the normal dehumidifying and heating mode, the controller 32 controls the valve position of the outdoor expansion valve 6 on the basis of the outdoor expansion valve target position TGECCVte.

That is, in this normal dehumidifying and heating mode, the controller 32 calculates the outdoor expansion valve target position TGECCVte and controls the valve position of the outdoor expansion valve 6 so that the heat absorber temperature Te reaches the target heat absorber temperature TEO, on the basis of the heat absorber temperature Te and the target heat absorber temperature TEO. In this case, when the heat absorber temperature Te is higher than the target heat absorber temperature TEO, the outdoor expansion valve target position TGECCVte becomes small, and the valve position of the outdoor expansion valve 6 is reduced to increase an amount of the refrigerant to flow into the heat absorber 9 through the refrigerant pipes 13F and 13B. Conversely, when the heat absorber temperature Te is lower than the target heat absorber temperature TEO, the outdoor expansion valve target position TGECCVte becomes large, and the valve position of the outdoor expansion valve 6 is expanded to decrease the amount of the refrigerant to flow into the heat absorber 9.

Thus, in the normal dehumidifying and heating mode, as the heat absorber temperature Te becomes lower than the target heat absorber temperature TEO, the controller 32 enlarges the outdoor expansion valve target position TGECCVte, expands the valve position of the outdoor expansion valve 6, and decreases the amount of the refrigerant to flow into the heat absorber 9 through the refrigerant pipes 13F and 13B. However, for example, when the outdoor air temperature is lowered, the temperature of the air to flow into the heat absorber 9 is also lowered. Therefore, even when the valve position of the outdoor expansion valve 6 is maximized (a maximum position of controlling), the temperature (the heat absorber temperature Te) of the heat absorber 9 becomes lower than the target heat absorber temperature TEO.

In the normal dehumidifying and heating mode, when the heat absorber temperature Te is lowered even in a state where the valve position of the outdoor expansion valve 6 is adjusted to the maximum position of controlling, the temperature becomes the above-mentioned predetermined value Telo or below, and its state continues for a predetermined time, the controller 32 proceeds from Step S3 to Step S4 to change control of the compressor 2 to control based on the heat absorber temperature Te as will be described later and operates (ON) the auxiliary heater 23 in Step S5. Next, the controller 32 determines whether the outlet temperature TAI detected by the outlet temperature sensor 41 can be made to be the target outlet temperature TAO. When it is determined to be affirmative, the controller 32 proceeds to Step S10 to shift to the heating auxiliary dehumidifying and heating mode.

(8-2) Heating Auxiliary Dehumidifying and Heating Mode

Figure 5:
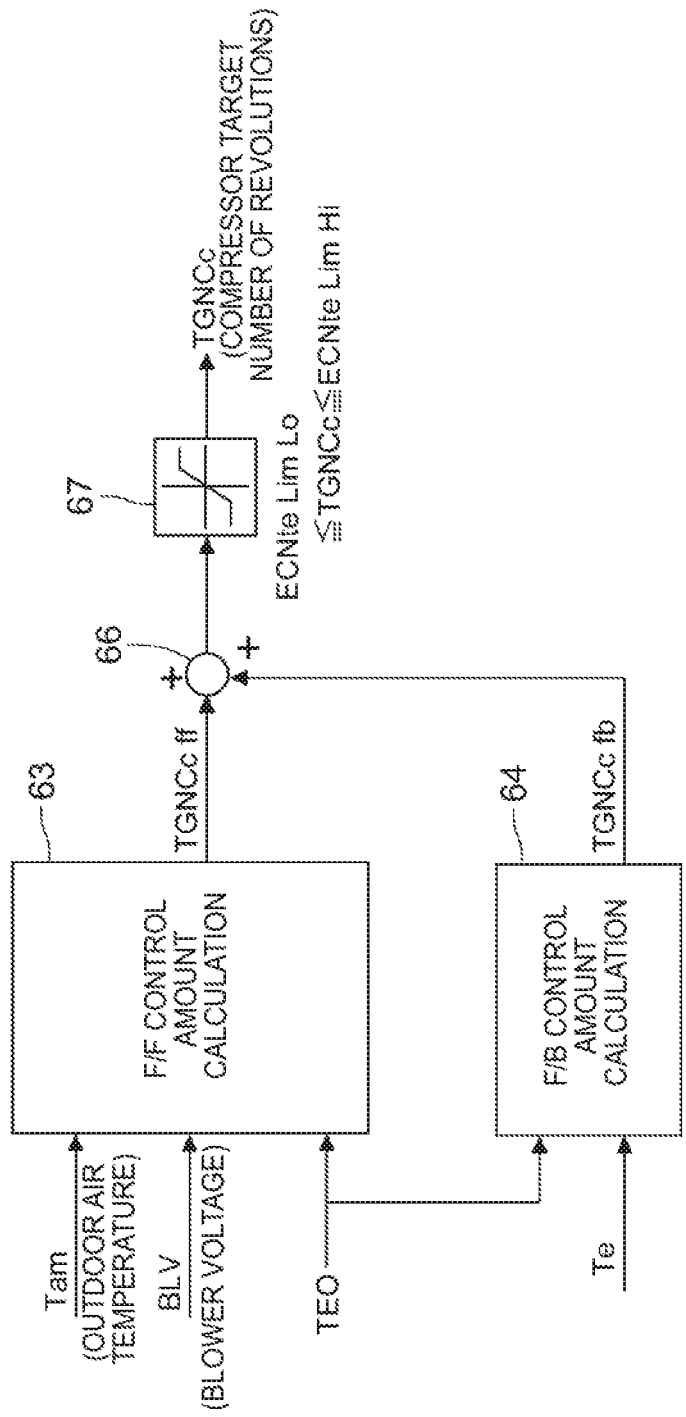
FIG. 5 is another control block diagram concerning the compressor control of the controller of FIG. 2.

FIG. 5 is a control block diagram of the controller 32 which determines a target number of revolutions (a compressor target number of revolutions) TGNCc of the compressor 2 in this heating auxiliary dehumidifying and heating mode. An F/F control amount calculation section 63 of the controller 32 calculates an F/F control amount TGNCcff of the compressor target number of revolutions on the basis of the outdoor air temperature Tam, the blower voltage BLV, and the target heat absorber temperature TEO that is the target value of the temperature of the heat absorber 9.

Further, an F/B control amount calculation section 64 calculates an F/B control amount TGNCcfb of the compressor target number of revolutions on the basis of the target heat absorber temperature TEO and the heat absorber temperature Te. Then, an adder 66 adds the F/F control amount TGNCcff calculated by the F/F control amount calculation section 63 and the F/B control amount TGNCcfb calculated by the F/B control amount calculation section 64. A limit setting section 67 attaches limits of an upper limit of controlling and a lower limit of controlling, and then determines a result thereof as the compressor target number of revolutions TGNCc. In the heating auxiliary dehumidifying and heating mode, the controller 32 controls the number of revolutions of the compressor 2 on the basis of this compressor target number of revolutions TGNCc.

That is, in this heating auxiliary dehumidifying and heating mode, the controller 32 calculates the compressor target number of revolutions TGNCc and controls the number of revolutions NC of the compressor 2 so that the heat absorber temperature Te reaches the target heat absorber temperature TEO, on the basis of the heat absorber temperature Te and the target heat absorber temperature TEO. Incidentally, the controller 32 maintains the valve position of the outdoor expansion valve 6 at the maximum position of controlling.

Furthermore, in this way, the controller 32 controls the number of revolutions NC of the compressor 2 on the basis of the heat absorber temperature Te, and hence, the pressure (the radiator pressure PCI) of the radiator 4 takes its own course. Therefore, in this heating auxiliary dehumidifying and heating mode, the controller 32 energizes the auxiliary heater 23 to generate heat (operate). In consequence, the air passed through the radiator 4 is heated by the auxiliary heater 23, and then flows toward the outlet 29.

Additionally, the controller 32 controls the energization of the auxiliary heater 23 on the basis of the target radiator temperature TCO (=the target outlet temperature TAO) which is the target value of the temperature of the air flowing toward the outlet 29. That is, the controller 32 controls the energization to the auxiliary heater 23 on the basis of the auxiliary heater temperature TSH detected by the auxiliary heater temperature sensor 50 and the target radiator temperature TCO, thereby controlling the heat generation of the auxiliary heater 23 so that the auxiliary heater temperature TSH reaches the target radiator temperature TCO. Consequently, the temperature (outlet temperature TCI) of the air to be blown out from the outlet 29 to the vehicle interior is prevented from falling.

(8-3) Return to Normal Dehumidifying and Heating Mode

Incidentally, in this heating auxiliary dehumidifying and heating mode, when the outdoor air temperature rises, the radiator pressure PCI also rises. During execution of the heating auxiliary dehumidifying and heating mode, the controller 32 returns to the above-mentioned normal dehumidifying and heating mode when the radiator pressure PCI detected by the radiator pressure sensor 47 becomes higher than a predetermined pressure PCIhi higher than the target radiator pressure PCO and its state continues for a predetermined time.

Thus, in the embodiment, in the dehumidifying and heating mode, when the heat absorber temperature Te falls to a predetermined value or below even where the controller performs control to adjust the valve position of the outdoor expansion valve 6 to the maximum position when the controller 32 executes the normal dehumidifying and heating mode to control the operation of the compressor 2 on the basis of the radiator pressure PCI and control the valve position of the outdoor expansion valve 6 on the basis of the heat absorber temperature Te, the controller shifts to the heating auxiliary dehumidifying and heating mode to control the operation of the compressor 2 on the basis of the heat absorber temperature Te and generate heat from the auxiliary heater 23. Therefore, when the temperature fall of the heat absorber 9 cannot be obstructed at the valve position of the outdoor expansion valve 6 in the normal dehumidifying and heating mode due to the fall of the outdoor air temperature, or the like, the controller shifts to the heating auxiliary dehumidifying and heating mode to control the heat absorber temperature Te by the operation control of the compressor 2, and make it possible to prevent the temperature fall of the heat absorber 9.

On the other hand, when the operation of the compressor 2 is controlled in accordance with the heat absorber temperature Te, the radiator pressure PCI cannot be controlled, but it is also possible to maintain the temperature (outlet temperature TAI) of the air to be blown out to the vehicle interior by generating heat from the auxiliary heater 23. For these reasons, it is possible to remove an evaporation pressure adjustment valve which has heretofore been provided on the refrigerant outlet side of the heat absorber 9, and comfortable dehumidifying and heating of the vehicle interior are achievable while achieving a cost reduction.

(9) Operation of Window Heater 35 During Outlet Temperature Non-Achievement and Shift Control to Heating Mode Here, as described above, in the heating auxiliary dehumidifying and heating mode, the controller controls the number of revolutions of the compressor 2 on the basis of the heat absorber temperature Te and the target heat absorber temperature TEO and controls the heat generation of the auxiliary heater 23 on the basis of the auxiliary heater temperature TSH and the target radiator temperature TCO. However, for example, when the outdoor air temperature is further lowered, the outlet temperature TAI cannot be maintained even when the amount of heat generated by the auxiliary heater 23 is adjusted to the maximum, and falls below the target outlet temperature TAO.

When, in the heating auxiliary dehumidifying and heating mode, the outlet temperature TAI falls even when the auxiliary heater 23 generates heat, and the outlet temperature cannot be reached the target outlet temperature TAO (non-achievement), the controller 32 proceeds from Step S6 to Step S7 to let the window heater 35 generate heat (operate) and shifts the operation mode to the heating mode in Step S8.

Subsequently, the refrigerant circuit R is changed to the above-mentioned flow of heating mode, and the control of the compressor 2 and the outdoor expansion valve 6 is also changed to the control in the heating mode. That is, the controller 32 controls the number of revolutions of the compressor 2 on the basis of the target radiator pressure PCO and the radiator pressure PCI and controls the valve position of the outdoor expansion valve 6 on the basis of the radiator temperature TCI and the radiator pressure PCI to control the subcool degree (SC) of the refrigerant in the outlet of the radiator 4.

Further, the window heater 35 is operated to heat the front window 30. On the basis of the temperature of the window heater 35 which is detected by the window heater temperature sensor 40, the controller 32 controls energization of the window heater 35 so that the temperature becomes a temperature at which the fog of the front window 30 can be eliminated or suppressed. Consequently, the fogging of the front window 30 can also be eliminated or suppressed while heating the vehicle interior.

Figure 7:
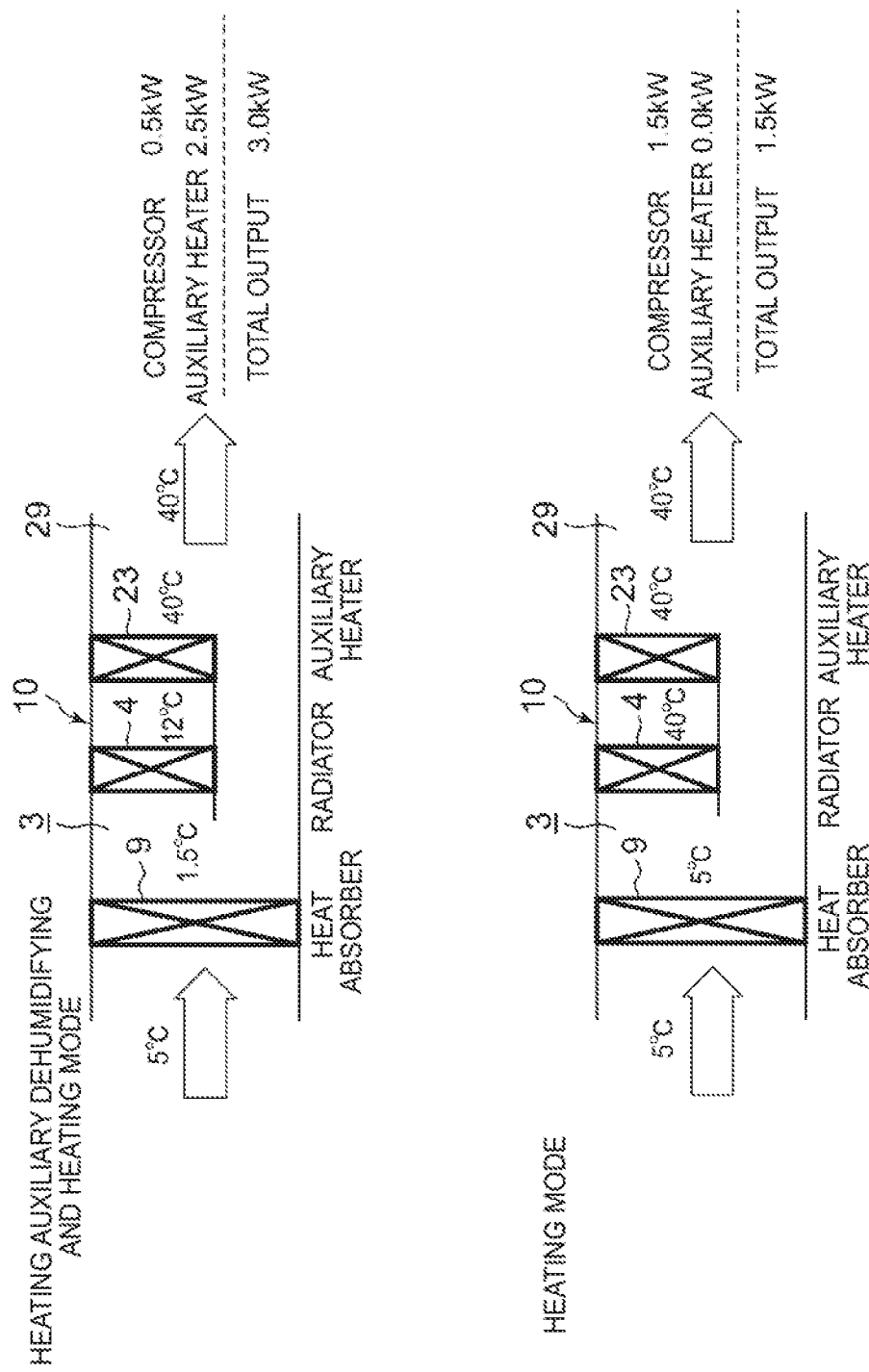
FIG. 7 is a diagram to explain outputs of a compressor and an auxiliary heater in the dehumidifying and heating mode and a heating mode.

FIG. 7 shows a difference between the outputs of the compressor 2 and the auxiliary heater 23 in the cases where when the target outlet temperature TAO is e.g., 40° C., it is achieved in the heating auxiliary dehumidifying and heating mode of the dehumidifying and heating mode and it is achieved in the heating mode. The heat absorber 9 absorbs heat of the refrigerant in the heating auxiliary dehumidifying and heating mode shown in the upper stage of FIG. 7. Therefore, when the temperature of the air sucked from the suction port 25 is 5° C., the temperature is lowered to, e.g., 1.5° C. by flowing of the air through the heat absorber 9. The temperature is raised to, e.g., 12° C. by the radiator 4, and further must be raised to 40° C. by the auxiliary heater 23. At that time, the output of the compressor 2 is, for example, 0.5 kW and the output of the auxiliary heater 23 is, for example, 2.5 kW, and hence the total output is raised to about 3.0 kW. That is, the high-output auxiliary heater 23 is required correspondingly.

On the other hand, since the refrigerant does not flow in the heat absorber 9 in the heating mode shown in the lower stage of FIG. 7, the temperature of the air passing through the heat absorber 9 also becomes 5° C. when the temperature of the air sucked from the suction port 25 is 5° C. Since the temperature may be raised to 40° C. by the radiator 4, there is no need to energize the auxiliary heater 23. That is, at that time, the output of the compressor 2 is, for example, 1.5 kW and the output of the auxiliary heater 23 is 0 kW, and hence the total output is lowered to about 1.5 kW. Since the output of the window heater 35 is low as compared with that of the auxiliary heater 23 or the like, the output does not reach the difference between the total output 3.0 kW in the heating auxiliary dehumidifying and heating mode and 1.5 kW in the heating mode. Consequently, it is understood that power consumption is also reduced when the operation is performed in the heating mode to actuate the window heater 35.

Incidentally, after such changing to the operation in the heating mode and the activation of the window heater 35, the radiator pressure PCI also rises when the outdoor air temperature is raised, for example. When the radiator pressure PCI detected by the radiator pressure sensor 47 becomes higher than the above-mentioned predetermined pressure PCIhi higher than the target radiator pressure PCO, and its state continues for a predetermined time, the controller 32 returns to the dehumidifying and heating mode.

As described above in detail, in this embodiment, when the outlet temperature TAI blown out to the vehicle interior is not capable of reaching the target outlet temperature TAO (target value) in the heating auxiliary dehumidifying and heating mode of the dehumidifying and heating mode when the window heater 35 for heating the front window 30 of the vehicle is provided, the controller actuates the window heater 35 to shift to the heating mode. Therefore, under the condition that it is not possible to set the outlet temperature TAI blown out to the vehicle interior to the target outlet temperature TAO due to the fall of the outdoor air temperature or the like, the operation mode is shifted to the heating mode, and the front window 30 of the vehicle can be heated by the window heater 35 while maintaining the outlet temperature TAI blown out to the vehicle interior at the target outlet temperature TAO. Thus, the fog of the front window 30 of the vehicle can also be eliminated or suppressed effectively while comfortably heating the vehicle interior.

Particularly, since there is no need to use the high output one as the auxiliary heater 23 in this embodiment, the fog of the front window 30 of the vehicle can efficiently be eliminated or suppressed. Then, for these reasons, the evaporation pressure adjustment valve which has heretofore been provided on the refrigerant outlet side of the heat absorber 9 can be removed, and a reduction in cost can also be achieved.

Embodiment 2

Figure 8:
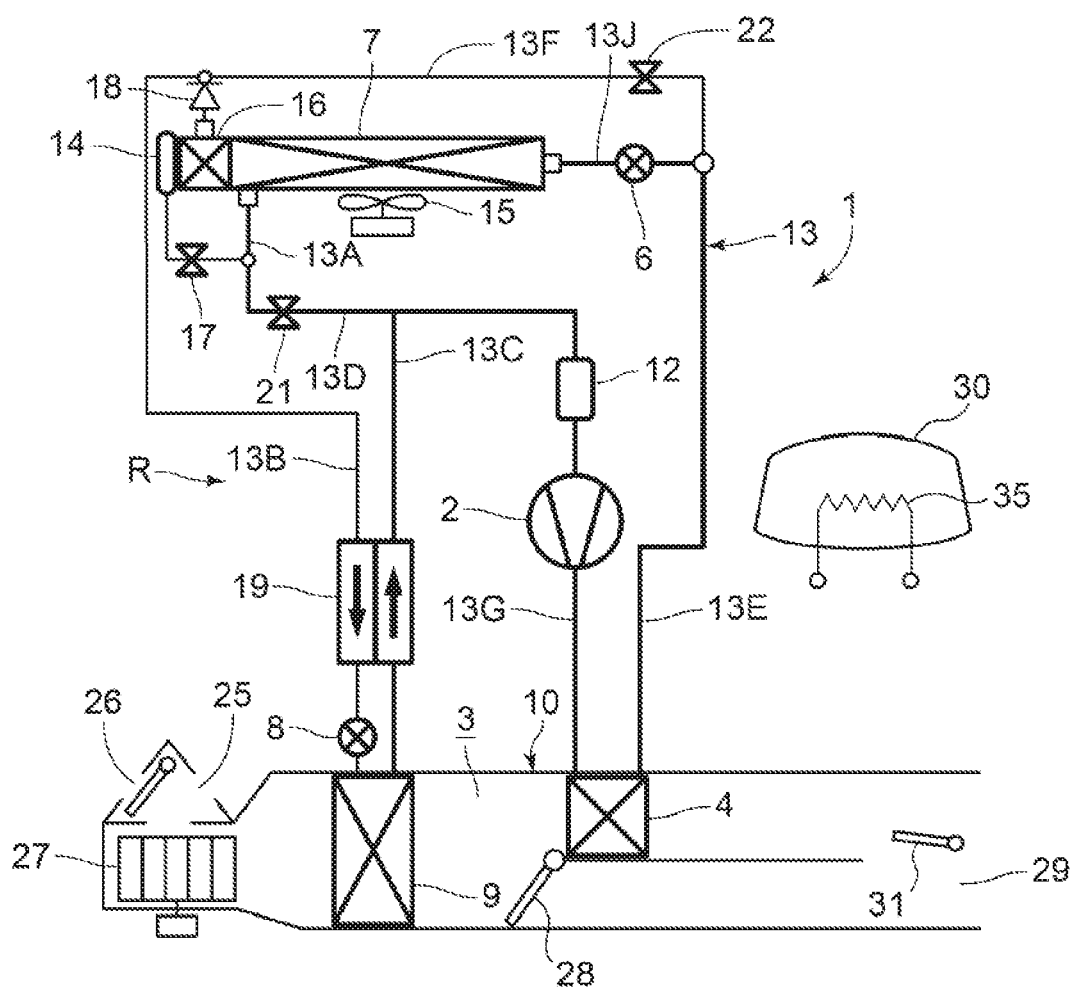
FIG. 8 is a constitutional view of a vehicle air-conditioning apparatus of another embodiment to which the present invention is applied (Embodiment 2)

Next, FIG. 8 and FIG. 9 respectively show a constitutional diagram of a vehicle air-conditioning apparatus 1 of another embodiment to which the present invention is applied. In the case of this embodiment, an auxiliary heater 23 is not provided. Other constitutions are similar to those in FIG. 1. Further, a controller 32 similarly changes and executes a heating mode, a dehumidifying and heating mode, an internal cycle mode, a dehumidifying and cooling mode, and a cooling mode. The control of the flow of a refrigerant and devices such as a compressor 2, an outdoor expansion valve 6, an indoor expansion valve 8, and each solenoid valve or the like in each operation mode is also similar, but their control is not executed because of the absence of the auxiliary heater 23.

(10) Operation of Window Heater 35 During Outlet Temperature Non-Achievement of this Embodiment and Shift Control to Heating Mode Next, description will be made as to control where an outlet temperature is not achieved in the dehumidifying and heating mode in the case of this embodiment while referring to FIG. 9. Even in this case, when the dehumidifying and heating mode is required in Step S1, the controller 32 starts up the dehumidifying and heating mode in Step S2. Next, in this case, the controller determines in Step S6A whether not to be able to set an outlet temperature TAI to a target outlet temperature TAO (non-achievement). When it is determined that the outlet temperature TAI can be reached the target outlet temperature TAO, the controller proceeds to Step S9A to execute the dehumidifying and heating mode.

On the other hand, similarly, even in a state in which an outdoor air temperature is lowered and a valve position of the outdoor expansion valve 6 is set to a maximum position of controlling, when the temperature (a heat absorber temperature Te) of the heat absorber 9 falls below a target heat absorber temperature TEO to fail to maintain the outlet temperature TAI, and hence the outlet temperature TAI becomes lower than the target outlet temperature TAO (non-achievement), the controller 32 proceeds to Step S7A to let the window heater 35 generate heat (operate) and shifts the operation mode to the heating mode in Step S8A.

Subsequently, in a manner similar to the above-mentioned embodiment, the refrigerant circuit R is changed to the flow in the heating mode, and the control of the compressor 2 and the outdoor expansion valve 6 is also changed to the control in the heating mode. That is, even in this case, the controller 32 controls the number of revolutions of the compressor 2 on the basis of a target radiator pressure PCO and a radiator pressure PCI and controls the valve position of the outdoor expansion valve 6 on the basis of a radiator temperature TCI and the radiator pressure PCI, and thereby controls a subcool degree (SC) of the refrigerant in an outlet of the radiator 4.

Further, the window heater 35 is operated to heat the front window 30. On the basis of the temperature of the window heater 35 which is detected by the window heater temperature sensor 40, the controller 32 controls energization of the window heater 35 so that the temperature becomes a temperature at which the fog of the front window 30 can be eliminated or suppressed. Consequently, the fogging of the front window 30 can also be eliminated or suppressed while heating a vehicle interior.

Incidentally, after such changing to the operation in the heating mode and the activation of the window heater 35, the radiator pressure PCI also rises when the outdoor air temperature is raised, for example. When the radiator pressure PCI detected by the radiator pressure sensor 47 becomes higher than the above-mentioned predetermined pressure PCIhi higher than the target radiator pressure PCO, and its state continues for a predetermined time, the controller 32 returns to the dehumidifying and heating mode as with the above-mentioned embodiment.

Even in this embodiment, when it is not possible to set the outlet temperature TAI blown out to the vehicle interior to the target outlet temperature TAO (target value) in the dehumidifying and heating mode when the window heater 35 for heating the front window 30 of the vehicle is provided, the controller actuates the window heater 35 to shift to the heating mode. Therefore, under the condition that it is not possible to set the outlet temperature TAI blown out to the vehicle interior to the target outlet temperature TAO due to the fall of the outdoor air temperature or the like, the operation mode is shifted to the heating mode, and the front window 30 of the vehicle can be heated by the window heater 35 while maintaining the outlet temperature TAI blown out to the vehicle interior at the target outlet temperature TAO. Consequently, the fog of the front window 30 of the vehicle can also be eliminated or suppressed effectively while comfortably heating the vehicle interior.

Since there is no need to provide a high output auxiliary heating device in order to heat the air blown out to the vehicle interior, the fog of the front window 30 of the vehicle can efficiently be eliminated or suppressed. These are effective where the operation of the compressor 2 is controlled on the basis of the radiator pressure PCI in the dehumidifying and heating mode and the heating mode as in the embodiment, and particularly effective where a refrigerant pipe 13F (bypass circuit) is provided, and the valve position of the outdoor expansion valve 6 is controlled on the basis of the heat absorber temperature Te in the dehumidifying and heating mode. Further, similarly, the evaporation pressure adjustment valve which has heretofore been provided on the refrigerant outlet side of the heat absorber 9 can be removed, and a reduction in cost can also be achieved.

Incidentally, the constitution of the refrigerant circuit R described in each embodiment described above is not limited thereto, but may be changed within the scope not departing from the spirit of the present invention. Further, the invention of claim 1 also includes where the heating mode of each embodiment described above, and the dehumidifying and heating mode to let all the refrigerants flow through the heat absorber 9 and absorb heat in accordance with the flow similar to that in the above-mentioned internal cycle mode without distributing the refrigerants caused to radiate heat in the radiator 4 in each of FIG. 1 and FIG. 8 are changed and executed. That is, in that case, a circuit similar to the flow of the refrigerant in the above-mentioned internal cycle mode becomes the dehumidifying and heating mode in the present invention.

Even in that case, as in each embodiment described above, in the heating mode and the dehumidifying and heating mode, the number of revolutions of the compressor 2 is controlled on the basis of the radiator pressure PCI and the target radiator pressure PCO, but the compressor 2 may be controlled by the radiator temperature TCI and the target radiator temperature TCO and may be controlled by the outlet temperature TAI and the target outlet temperature TAO. However, when the compressor 2 is controlled on the basis of the radiator pressure PCI as with the above embodiment, controllability becomes satisfactory.

Also, even in the heating mode and the normal dehumidifying and heating mode of the above embodiment 1, and the heating mode and the dehumidifying and heating mode of the embodiment 2, the compressor 2 may be controlled on the basis of the radiator temperature TCI and the target radiator temperature TCO without based on the radiator pressure PCI, and may be controlled on the basis of the outlet temperature TAI and the target outlet temperature TAO. However, similarly, when the compressor 2 is controlled on the basis of the radiator pressure PCI and the target radiator pressure PCO as in the embodiment, controllability becomes satisfactory.

Further, although description has been made as to the case where in each embodiment, the front window 30 of the vehicle in which the fog becomes the most problematic upon running is heated by the window heater 35, a vehicle window to be applied can be applied not only to the front window 30 of the embodiment but also a rear window and a side window in addition to the front window 30. Incidentally, in the case of the rear window, a window heating device is constituted of an electric heating wire called a rear defogger.

Additionally, the heat generation of the window heater 35 is controlled on the basis of the temperature detected by the window heater temperature sensor 40 in the embodiment, but the window heater 35 is not limited to its control. Such control as to generate a predetermined amount of heat generation by the normal energization or intermittent energization is also effective. Further, in the embodiment, the window heater 35 is constituted of the heating wire (electric heating wire) included in the front window 30, but not limited thereto. For example, the window heating device may be constituted of a fog suppressing device or the like to blow hot air heated by an electric heater onto the inner and outer surfaces of the front window 30.

Furthermore, in the embodiment 1, description has been made as to the provision of the auxiliary heater 23 constituted of the PCT heater in the air flow passage 3, but the auxiliary heater 23 is not limited thereto. A water-air heat exchanger is disposed in the air flow passage 3, and water heated by a heater may be circulated through this water-air heat exchanger by a circulation circuit to heat air blown out to the vehicle interior.

Additionally, each embodiment described above has been described by taking the example of changing the respective operation modes of the heating mode, the dehumidifying and heating mode, the internal cycle mode, the dehumidifying and cooling mode, and the cooling mode, but is not limited thereto. The present invention is effective in a vehicle air-conditioning apparatus which changes and executes at least the heading mode and the dehumidifying and heating mode.

DESCRIPTION OF REFERENCE NUMERALS 1 vehicle air-conditioning apparatus
2 compressor
3 air flow passage
4 radiator
6 outdoor expansion valve
7 outdoor heat exchanger
8 indoor expansion valve
9 heat absorber
13F refrigerant pipe (bypass circuit)
22 solenoid valve (opening/closing valve)
23 auxiliary heater (auxiliary heating device)
30 front window (window)
32 controller (control device)
35 window heater (window heating device)
R refrigerant circuit.

The invention claimed is:
1. A vehicle air-conditioning apparatus comprising:
a compressor to compress a refrigerant;
an air flow passage through which air to be supplied to a vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger provided outside the vehicle interior to let the refrigerant absorb heat;
a window heating device to heat a window of a vehicle; and
a control device,
whereby the control device changes and executes at least a heating mode to let the refrigerant discharged from the compressor radiate heat in the radiator and let the refrigerant absorb heat in the outdoor heat exchanger to heat the vehicle interior, and
a dehumidifying and heating mode to let the refrigerant discharged from the compressor radiate heat in the radiator and let the refrigerant absorb heat in the heat absorber to execute dehumidifying and heating of the vehicle interior,
wherein in the dehumidifying and heating mode, when the temperature of the air blown out to the vehicle interior is not capable of reaching a target value, the control device actuates the window heating device and shifts to the heating mode.
2. The vehicle air-conditioning apparatus according to claim 1, wherein in the heating mode and the dehumidifying and heating mode, the control device controls the operation of the compressor on the basis of a pressure of the radiator.
3. The vehicle air-conditioning apparatus according to claim 2, wherein an evaporation pressure adjustment valve is not provided on a refrigerant outlet side of the heat absorber.
4. The vehicle air-conditioning apparatus according to claim 1, wherein an evaporation pressure adjustment valve is not provided on a refrigerant outlet side of the heat absorber.
5. A vehicle air-conditioning apparatus comprising:
a compressor to compress a refrigerant;
an air flow passage through which air to be supplied to a vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger provided outside the vehicle interior to let the refrigerant absorb heat;
an outdoor expansion valve to decompress the refrigerant flowing into the outdoor heat exchanger;
a bypass circuit connected in parallel with a series circuit of the outdoor heat exchanger and the outdoor expansion valve;
an indoor expansion valve to decompress the refrigerant flowing into the heat absorber;
a window heating device to heat a window of a vehicle; and
a control device,
whereby the control device changes and executes at least a heating mode to let the refrigerant discharged from the compressor radiate heat in the radiator, let the heat-radiated refrigerant flow into the outdoor heat exchanger through the outdoor expansion valve, and let the refrigerant absorb heat in the outdoor heat exchanger to heat the vehicle interior, and
a dehumidifying and heating mode to let the refrigerant discharged from the compressor radiate heat in the radiator, distribute the heat-radiated refrigerant, let a part of the refrigerant flow from the bypass circuit to the heat absorber through the indoor expansion valve, let the refrigerant absorb heat in the heat absorber, let the residual refrigerant flow into the outdoor heat exchanger through the outdoor expansion valve, and let the refrigerant absorb heat in the outdoor heat exchanger to execute dehumidifying and heating of the vehicle interior,
wherein in the dehumidifying and heating mode, the control device controls the operation of the compressor on the basis of a pressure of the radiator and controls a valve position of the outdoor expansion valve on the basis of a temperature of the heat absorber, and when the temperature of the air blown out to the vehicle interior is not capable of reaching a target value, the control device actuates the window heating device and shifts to the heating mode.
6. The vehicle air-conditioning apparatus according to claim 5, wherein in the heating mode, the control device controls the operation of the compressor on the basis of the pressure of the radiator and controls the valve position of the outdoor expansion valve on the basis of a temperature and the pressure of the radiator.
7. The vehicle air-conditioning apparatus according to claim 6, wherein an evaporation pressure adjustment valve is not provided on a refrigerant outlet side of the heat absorber.
8. The vehicle air-conditioning apparatus according to claim 5, wherein an evaporation pressure adjustment valve is not provided on a refrigerant outlet side of the heat absorber.

9. A vehicle air-conditioning apparatus comprising:
a compressor to compress a refrigerant;
an air flow passage through which air to be supplied to a vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger provided outside the vehicle interior to let the refrigerant absorb heat;
an outdoor expansion valve to decompress the refrigerant flowing into the outdoor heat exchanger;
a bypass circuit connected in parallel with a series circuit of the outdoor heat exchanger and the outdoor expansion valve;
an indoor expansion valve to decompress the refrigerant flowing into the heat absorber;
an auxiliary heating device to heat the air to be supplied from the air flow passage to the vehicle interior;
a window heating device to heat a window of a vehicle; and
a control device,
whereby the control device changes and executes at least a heating mode to let the refrigerant discharged from the compressor radiate heat in the radiator, let the heat-radiated refrigerant flow into the outdoor heat exchanger through the outdoor expansion valve, and let the refrigerant absorb heat in the outdoor heat exchanger to heat the vehicle interior, and
a dehumidifying and heating mode to let the refrigerant discharged from the compressor radiate heat in the radiator, distribute the heat-radiated refrigerant, let a part of the refrigerant flow from the bypass circuit to the heat absorber through the indoor expansion valve, let the refrigerant absorb heat in the heat absorber, let the residual refrigerant flow into the outdoor heat exchanger through the outdoor expansion valve, and let the refrigerant absorb heat in the outdoor heat exchanger to execute dehumidifying and heating of the vehicle interior,
wherein in the dehumidifying and heating mode, the control device executes a normal dehumidifying and heating mode to control an operation of the compressor on the basis of a pressure of the radiator and control a valve position of the outdoor expansion valve on the basis of a temperature of the heat absorber, and
in the normal dehumidifying and heating mode, when the temperature of the heat absorber is lowered to a predetermined value or below even by the control of the outdoor expansion valve, the control device shifts to a heating auxiliary dehumidifying and heating mode to control the operation of the compressor on the basis of the temperature of the heat absorber and actuate the auxiliary heating device, and
wherein in the heating auxiliary dehumidifying and heating mode, when the temperature of the air blown out to the vehicle interior is not capable of reaching a target value, the control device actuates the window heating device and shifts to the heating mode.

10. The vehicle air-conditioning apparatus according to claim 9, wherein in the heating mode, the control device controls the operation of the compressor on the basis of the pressure of the radiator and controls the valve position of the outdoor expansion valve on the basis of a temperature and the pressure of the radiator.

11. The vehicle air-conditioning apparatus according to claim 9, wherein an evaporation pressure adjustment valve is not provided on a refrigerant outlet side of the heat absorber.

* * * * *